Dec. 10, 1957  J. G. CASANOVA  2,815,738
FUEL FEED VALVES FOR DIESEL ENGINES
Filed March 25, 1955  2 Sheets-Sheet 1

INVENTOR.
JOAN GERMAN CASANOVA
BY
ATTORNEYS

Dec. 10, 1957 J. G. CASANOVA 2,815,738
FUEL FEED VALVES FOR DIESEL ENGINES
Filed March 25, 1955 2 Sheets-Sheet 2
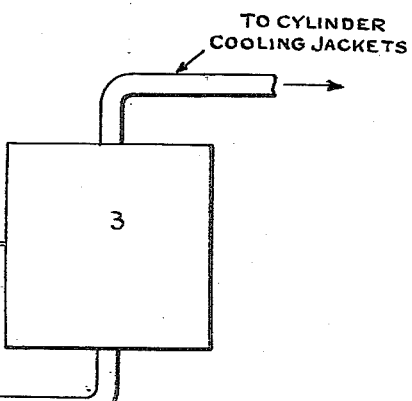
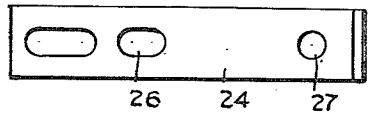
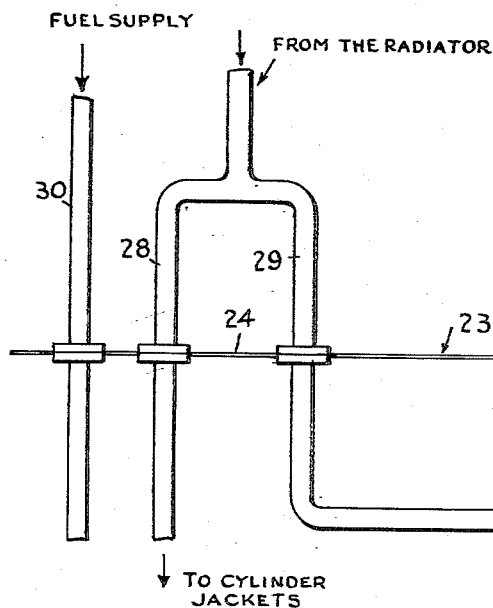
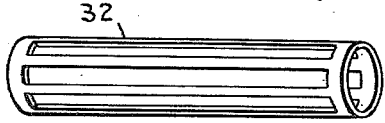
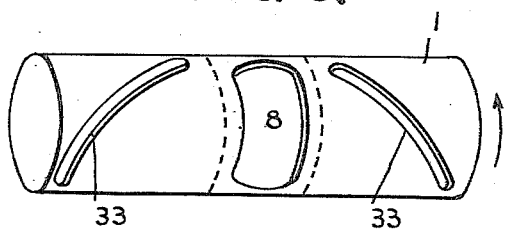
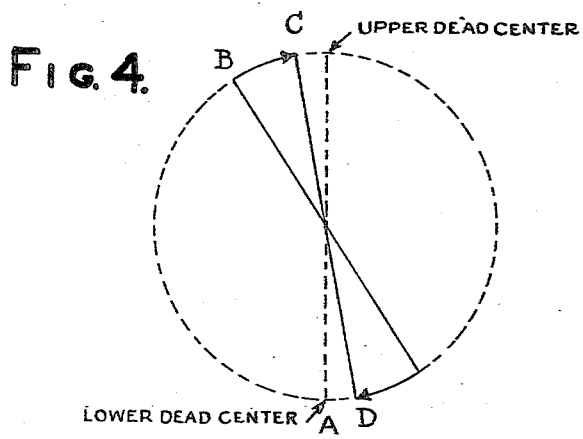
INVENTOR.
JOAN GERMAN CASANOVA
BY
*ATTORNEYS*

United States Patent Office 2,815,738
Patented Dec. 10, 1957

2,815,738
FUEL FEED VALVES FOR DIESEL ENGINES

Juan Germán Casanova, Santiago, Chile

Application March 25, 1955, Serial No. 496,886

5 Claims. (Cl. 123—27)

This invention relates to fuel feed valves for diesel engines and has for its object to provide a rotary fuel feed valve whereby the fuel is fed without pressure into the cylinder of the engine, whatever be the pressure at which such engines work.

It is well known that a considerable portion of the weight of diesel engines in actual use is due to fuel injection systems, whether using high pressure or measuring pumps, and their accessories. If all that assembly can be omitted and replaced by a low pressure fuel feed pump and simpler and lighter accessories than those required hitherto, the weight of the engine can be much reduced, and diesel engines may be more advantageously used in road cars and airplanes. Also the frequent failures of the fuel injection systems actually used, which are due to complication and delicacy of parts and obstruction of the fuel inlets, may be estimated at 90% of the total failures of these engines.

Up to the present the use of rotary fuel feed valves in internal combustion engines has not been practically possible on account of the expansion of the valve within its housing due to the heat of combustion of the engine, a very close fit between the valve and housing being of course necessary, and the difference in the expansion of the valve and housing when the engine is working would cause either undue slackness or gripping of the valve. It is therefore necessary to provide an automatically regulated temperature for the fuel feed valve and the housing, and this may be done by the thermostat arrangement of the present invention.

The above mentioned drawbacks may be obviated by the device of the present invention which comprises a cylindrical rotary fuel feed valve and housing of a special type secured to the cylinder head of the engine, and a thermostat and accessories for maintaining a substantially constant working temperature for the feed valve and housing, all of which are described hereinbelow in connection with the accompanying drawings in which:

Figure 3 is a side view of the cylindrical rotary fuel feed valve;

Figure 4 is a graph showing the relative positions of the fuel feed valve and crank shaft of the engine during the working thereof;

Fig. 5 is a schematic drawing of the piping and connections used for a cooling water distribution in connection with the engine thermostat arrangement;

Figure 6 shows an insulating sleeve used in an electrical heating circuit for the thermostat device; and Figure 7 is a schematic drawing of a slide valve and ports thereof for the cooling water distribution in connection with the engine thermostat arrangement.

Figure 1:
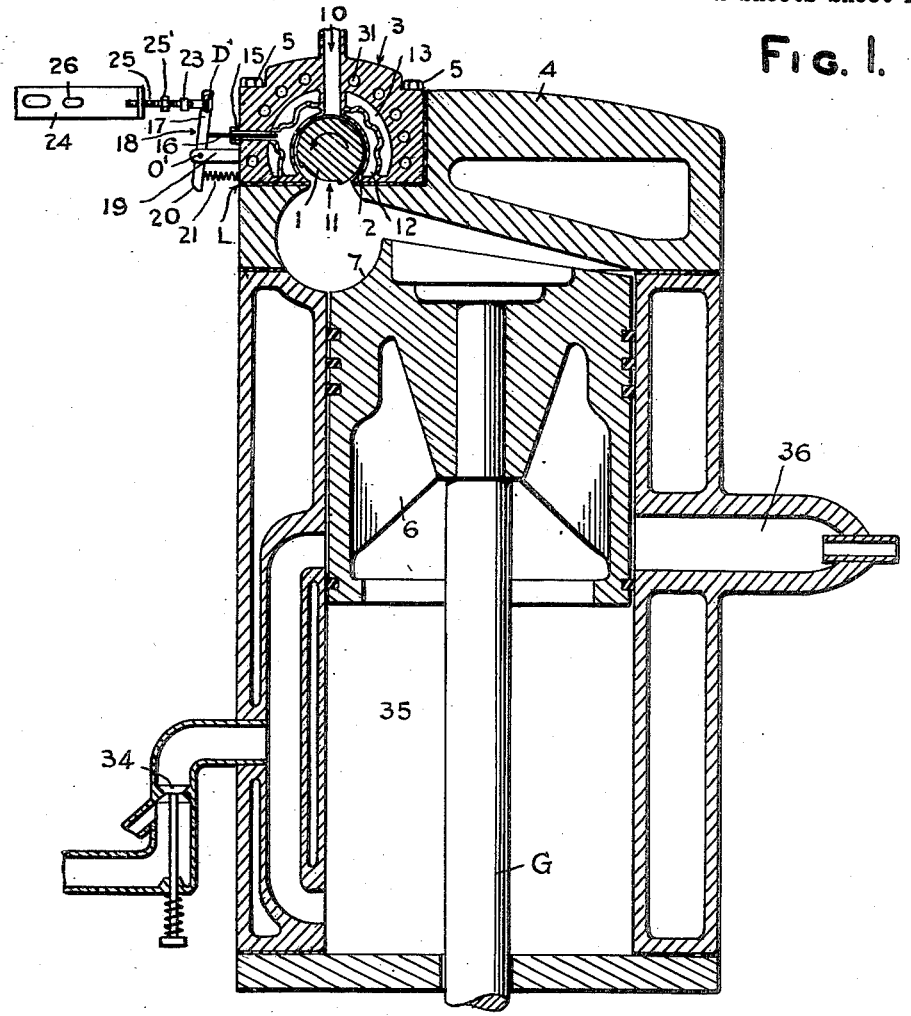
Figure 1 is a cross-sectional view of a cylinder of a diesel engine showing the cylinder head with a cylindrical rotary fuel feed valve, valve housing, thermostat device and accessories according to the present invention.
Figure 2:
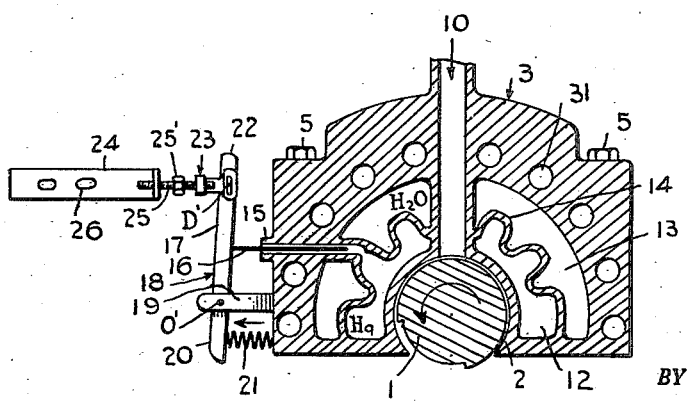
Figure 2 is a cross-sectional view showing on a larger scale the rotary valve, valve casing, thermostat device and accessories attached to the cylinder head.

In the drawings, a cylindrical rotary fuel feed valve 1 is adjusted within a horizontal cylindrical seat 2 of a housing member 3 suitably fitted and secured to the cylinder head 4 of the engine, as with bolts 5. Between the piston 6 and cylinder head 4 a cavity 7 is formed for inducing therein a turbulence of the air compressed within the engine cylinder and directly upwards the sweeping air current at the end of the out-stroke of the piston. The rotary fuel feed valve 1 has a shallow circumferential recess 8 which serves for transporting with the rotation thereof a very fine film of fuel from an exterior source to the interior of the engine cylinder. The horizontal cylindrical valve seat 2 has an upper orifice 9 communicating with a fuel feed tube 10 and a lower aperture 11 communicating with the engine cylinder. A fuel feed pump (not shown) provides the fuel which is directed with very slight pressure onto the recess 8 of the rotary valve 1 which on rotating carries the fuel to the interior of the cylinder head where it is vaporized and mixed with the air of combustion in known manner.

The operation of the valve 1 is synchronized with the rotation of the crank shaft of the engine, at the same rotating speed, and may be effected by chain drive (not shown).

The thermostat device of the present invention comprises two chambers 12, 13, which are located within the housing 3 and surround the rotary valve 1.

Chamber 12 is filled with mercury and communicates with a duct 15 within which is slidably adjusted a stem 16, which has a sliding inward and outward motion governed by the expansion or contraction of the mercury. The stem 16 is connected to an arm 17 of a lever 18 pivoted to a bracket 19; an arm 20 of this lever is joined to a spiral spring 21, which with its compression urges the stem 16 inwards when the temperature of valve 1 is below the required normal temperature. The end 22 of the lever arm 17 is connected by a pin and slot arrangement to a link 23 which is joined to a slide valve 24 by means of a right and left threaded length-adjusting screw 25. The slide valve 24, which is schematically shown in Fig. 7 as a flat metallic strip, is provided with ports 25, 26, and 27, and slides transversely through passages in pipes 28, 29 and 30, thereby admitting or shutting off the passage of cooling water from the radiator of the engine through pipes 28, 29 to the chamber 13 and water jackets of the engine as required, and the passage of fuel through pipe 30. Chamber 13 is filled with cooling water from the radiator and is separated from the mercury chamber 12 by a partition 14 of corrugated form, the corrugations serving to increase the cooling surface for the member 3. This member is also provided with a series of cylindrical holes 31 in the proximity of the outer periphery of chamber 13, the holes 31 enclosing electrical heating units for producing an initial working temperature of the valve 1 as hereinafter explained. These heating units are enclosed in insulating longitudinally slotted tubes 32.

With regard to the action of the slide valve 24, its sliding motion will make the ports 25, 26 and 27 coincide totally or partially, or not coincide, with the passages of pipes 30, 28 and 29 respectively, so that water from the radiator of the engine can circulate through any one of the pipes 28 and 29 freely or be partially or totally intercepted according to the position of ports 26 and 27. The distance between these latter ports is greater than the distance between pipes 28 and 29 by one diameter of the cross-section of these pipes so that the maximum amount of water cannot pass through both pipes at the same time, and one of them may be completely closed and all the water from the radiator allowed to pass through the other. Between the extreme right and left positions of valve 24 varying proportions of water flow through these pipes may be obtained, so that the greater the flow through pipe 28, the lesser flow through pipe 29 and vice versa. When the valve 24 arrives at its extreme position on the left, pipe 30 will also be shut off.

The speed and volume of water circulation through chamber 13 and the engine jackets should be so regulated that, at any speed of the motor and under any load within reasonable limits, member 3 will be kept at a temperature of about 120° C. or other convenient temperature for the close fit of the rotary valve 1 in its bearing 2, when the slide valve 24 closes one half of the internal cross-section of tubes 28 and 29.

Considering now the operation of the thermostat arrangement above described, the volume of member 3 being for example 800 cm.$^3$, chamber 12 may have a volume of ¼ of this member, and duct 15 should have in this case a length of 4 cm. and an inside diameter slightly under 0.4 cm. so that the total capacity of this duct should be approximately 480 mm.$^3$. This duct is filled in about 3.5 cm. of its length when the rotary valve 1 is at a temperature of 120° C., by a stem 16 whose length is also 4 cm. The pipes 28 and 29 must be half closed when valve 1 is at a temperature of 120° C., which is the temperature preferably selected as appropriate for the working of the fuel feed valve 1, and therefore these pipes will only allow each the passage of half the quantity of water that either of them would allow to pass when unobstructed. If the inside diameter of these pipes is 4 cm., valve 24 will only have to slide 2 cm. to the left to close pipe 28 and open pipe 29 completely and the reverse will take place on the motion of valve 24 to the right. If A and B are the lengths of arms 17 and 20 respectively of lever 18 and $O'B':O'D'=1/4$, it will be sufficient for the stem 16 to slide outwards or inwards a distance of 0.5 cm. to produce full water flow in either of the pipes 28 or 29. The operation of the thermostat adopted being based on the expansion of the mercury contained in chamber 12, if T is the temperature above 120° C. required for the mercury to expand 60 mm.$^3$ above volume occupied at 120° and $V_T$ the volume of mercury at temperature T and $t$ the temperature of the expanded volume $V_t$ i. e. 200.06 cm.$^3$, and $m=0.00018$ the coefficient of expansion of mercury per degree centigrade, we have $$V_T = V_t(1+m[T-t])$$

where $$V_T = 200.12 \text{ cm.}^3$$

$$V_t = 200.06 \text{ cm.}^3$$

$$T = X \text{ °C.}$$

$$t = 120 \text{ °C.}$$

$$m = 0.00018 \times \frac{1}{\text{degrees C.}}$$

Therefore, $200.12 = 200.06 \ (1+0.00018[X-120])$, from which we obtain $X=121.72°$ C. approximately. This means that a variation of 1.72° C. in temperature of the cylindrical rotary feed valve 1 is enough to produce a displacement of the slide valve 24 which will direct and graduate the flow of the radiator cooling water through pipes 28 and 29 so that the temperature of the rotary valve 1 will not rise above 121.72° C. nor descend below 118.28° C.

The condition that member 3 will maintain a temperature of substantially 120° C. is easily attainable when pipes 28 and 29 are about half-closed, since chamber 13 and the water jackets of the engine cylinder are directly connected to the radiator. Furthermore, the small volume of member 3 and its insulation facilitates the maintenance of the required temperature of the rotary valve 1. Means are provided for allowing the expansion and contraction of the attaching bolts 5 of member 3 to the engine, and a thermometer is placed in contact with member 3 so as to check the fluctuations of temperature in this member and maintain the temperature of valve 1 regulated to the required proximity of 120° C.

In operation, in order to start the engine, the switch of the heating electric circuit of member 3 is closed so as to raise the temperature of this member to 120° C., and when this temperature is reached the switch is opened, the electric starting motor connected, thus putting the diesel engine in motion; the starting electric motor being then disconnected, the temperature regulation is obtained as above described. In order to adjust the thermostat mechanism, if the thermometer at member 3 should after a few minutes working indicate that the temperature thereof is below or above 120° C., the adjusting screw 25, the ends of which are threaded right and left hand, respectively, is turned by means of its nut 25' so as to displace the slide valve 24 to the left or to the right and so to regulate the flow of cooling water of the engine.

Lubrication of the rotary fuel feed valve 1 may be affected as follows: The recesses 33 of this valve serve for taking up the lubricating oil which is supplied at a very low pressure by an oil pump driven along with the fuel feed pump of the engine, the lubricating oil being distributed, by the rotation of valve 1, over the cylindrical surface thereof on both sides of the fuel recess 8, up to the proximity of this recess. The pressure exerted by the lubricating oil pump is lower than the pressure exerted by the fuel feed pump within the recess 8, so that the fuel and lubricating oil do not get mixed, and should there be a small proportion of mixture it will be ignited within the engine cylinder without difficulty.

The speed of the diesel engine may be governed, according to the invention, in any of the following ways:

(1) By means of a throttle valve connected to the fuel oil feed tube, wherewith the flow of fuel may be regulated to vary the engine speed and the action of the lubricating oil pump attached thereto.

(2) By suitable means for sliding the rotary valve axially with respect to the inlet opening 10 to vary more or less the amount of fuel carried by the recess to the combustion chamber.

(3) By means of an electric motor connected in the usual manner to a battery which drives both the fuel and lubricating oil pumps. The engine speed in this case is governed by a rheostat connected in series with the electric motor so as to regulate the speed of the fuel pump and the oil pressure supplied thereby. The speed of the diesel engine will depend directly on this fuel oil pressure, since however low be the speed of the diesel engine, there will always be a small fraction of a second elapsing while the recess 8 passes the fuel inlet, and the amount of fuel fed will depend on the pressure exerted by the feed pump, the limit of maximum fuel feed being reached when this pump fills the recess 8 completely at the maximum speed of the electric motor, so that by regulating the speed of the electric motor, the speed of the engine is also regulated.

Working of the engine

Near the end of the compressing stroke of the engine the air in the combustion space above the piston is highly compressed and whirling with turbulence in recess 7 while within the cylinder space 35 below the piston the air drawn through valve 34 is ready to be compressed by the firing stroke. At this moment the recess 8 commences to be uncovered in front of inlet 11 and carries the fuel oil film in the recess 8 into the recess 7 and this oil is taken up by the whirling air and the explosive mixture fired, all this process occurring while said vaporized fuel oil film passes through inlet 11, when the firing stroke takes place. The recess 8 ends its passage in front of inlet 11 just before the piston arrives at the end of its downward stroke. Nearly at the same time the exhaust port 36 is uncovered, and then the air admission port, so as to allow the sweeping air to pass from the lower to the upper space of the engine cylinder.

Since the cylindrical rotary fuel feed valve 1 rotates at the same rate as the crank shaft, recess 8 of that valve commences to be opened to the fuel inlet 10 at the end of the downward stroke of the piston and to be filled again with fuel for the next firing stroke. It must be noted that the recess 8 is never in simultaneous connection with inlets 10 and 11, this recess not being long enough for establishing that connection, thus when the fuel film fills recess 8 and moves to a position facing the combustion space, it is enclosed by walls of the cylindrical valve housing so that the fuel fed cannot escape. In the schematic Figure 4, the opening of the fuel inlets 10 and 11 to the recess 8 is shown in relation to the crank shaft rotation represented by the circle 36. Here the full line portions of the circumference of the circle represent two portions of a revolution of the crank shaft in which the recess 8 is not in communication with any of the inlets 10 and 11, while of the dotted portions of the circumference, the arc AB represents the angular rotation of the crank shaft when the recess 8 is in communication with inlet 10, and the arc CD represents the angular rotation of the crank shaft when the recess 8 is connected to the inlet 11.

Thus, when the crank arrives at A, that is, nearly at the end of the downward stroke of the piston, the recess 8 starts communicating with the inlet 10 to receive fuel while the crank shaft turns through the arc AB. When the crank arrives at B the recess 8 is shut off from both inlets 10 and 11. Finally, while the crank shaft turns from C to D, the recess 8 is continually connected to the inlet 11 until the crank arrives at D, and while the shaft turns through the arc DA the recess is again disconnected from both inlets 10 and 11. Vaporization of the fuel occurs during this interval CD when the heated fuel is exposed in a thin film to the high temperature in the combustion space.

The same pressureless fuel feed injection for diesel engines may be obtained by substituting the automatic temperature control or thermostat arrangement above described by an automatic pressure compensator which acts on a rotating disk and replaces the cylindrical rotary fuel feed valve in the following manner:

The flat horizontal disk 51 shown in the accompanying Figure 9 is connected to the crank shaft of the engine by a transmission corresponding to the working cycle of the engine. The disk 51 has a recess on its under surface for a purpose similar to that of the cylindrical rotary fuel feed valve previously described. The engine cylinder has an upper opening or port 52 which registers with the recess of disk 51 at every revolution and for a certain period thereof. The duct 53 at an exterior portion of the upper end of the cylinder casting is connected to the fuel pump (not shown). A balancing lever 54 is jointed at one end to a piston rod 55 and has at its other end a vertical leg for supporting a roller 56 which is in contact with the upper surface of disk 51 and rolls near the periphery of this disk on the rotation thereof.

The fuel pump supplies the fuel with a very slight pressure exerted against the under surface of the disk, the pressure being sufficient for the fuel, when the recess of the disk registers with the fuel duct 53, to fill the recess, and that quantity of fuel is carried by the rotating disk to the opening of port 52, so that this port and the recess will register when the piston of the engine arrives at the upper end of the stroke.

The great pressure exerted within the engine cylinder would tend to lift the disk, as this must rotate with some play to allow for expansion within its housing, but this tendency is counteracted by the automatic action of the pressure compensator formed by the balancing lever 54 which bears against that portion of the disk which registers with ports 52 with a pressure which is equal to the upward pressure exerted by the piston rod 55 due to the compression of the air within the engine cylinder. Of course, the two arms of the balancing lever 54 must be of equal length, and the diameters of the piston rod 55 and port 52 must also be equal.

The same pressureless fuel feed injection may be also obtained, lastly, by means of the device illustrated in Figures 10 and 11, which has the advantage of being very simple.

A small horizontal piston 41 is housed at the side of the main engine piston and near the upper end thereof. The piston 41 has sufficient clearance to provide for heat expansion, and has also compression rings. At its exterior surface this piston is provided with a fuel transporting recess which in this case takes the form of a spherical segment. This piston has a horizontal motion and its displacement to the right and left is limited by abutments 42 and is permanently urged outwards by a spiral spring 43.

At the end of each down stroke of the main piston, the fuel is impelled by the fuel pump through a suitable valve (not shown) which opens only when the piston 41 uncovers the port 44 in the cylinder wall, through the port 44 and fed into the recess of piston 41, which registers with the port 44 when the piston arrives at the end of its downward stroke. The pressure exerted by the spring 43 on the piston 41 which bears on the wall of the engine cylinder prevents the fuel oil carried in the recess of piston 41 from escaping to the cylinder. When the main piston arrives at the upper end of its stroke, the recess of the small piston 41 forms a part of the spherical combustion chamber of the engine and the fuel film stored in piston 41 is drawn into the combustion chamber and dispersed by the turbulence of the air.

The invention enables all high pressure pumps and pipe lines, injection nozzles and complicated mechanical devices for measuring the fuel to be dispensed with, their functions being performed by the simple and compact valve and vaporizing means illustrated.

The invention is not restricted to the illustrated mechanism, this being for illustrative purposes, but what is claimed and desired to be protected by patent is as follows.

I claim:

1. An internal combustion engine of the high compression self-ignition type having a jacketed cylinder provided with inlet and outlet openings in its side walls adapted to be covered by a piston reciprocating therein, a rotary valve mounted in the cylinder wall for admitting liquid fuel to the combustion space in said cylinder, said rotary valve having a shallow fuel chamber in its peripheral surface, means for rotating said valve in synchronism with the operation of said engine, a fuel supply having an opening discharging into said fuel chamber once during each rotation of said rotary valve, an expansible fluid chamber surrounding said rotary valve, a cooling medium chamber surrounding said expansible fluid chamber, a supply of cooling medium, separate fluid connections between said cooling medium chamber and the cylinder jacket respectively and said supply of cooling medium, adjustable valve means for controlling the amount of cooling medium passing into said chamber and directly into said cylinder jacket, respectively, and means actuated by a temperature responsive fluid in said expansible fluid chamber for positioning said adjustable valve means to control the relative proportions of cooling medium flowing directly into said cylinder jacket, and into said cylinder jacket through said cooling medium chamber, respectively, whereby the amount of water passing into said cylinder jacket is maintained constant and the temperature of said rotary valve is maintained substantially uniform to vaporize fuel in said fuel chamber upon its exposure to the combustion space in said cylinder.

2. An engine as set forth in claim 1 wherein the expansible fluid space immediately surrounding said valve is filled with mercury.

3. An engine as set forth in claim 1 wherein the adjustable valve also controls the supply of fuel to the fuel chamber in said rotary valve.

4. An engine as set forth in claim 1 wherein the expansible fluid actuated means comprises an adjustable element for changing the setting of the adjustable valve means with respect to the temperature of the fluid.

5. An engine as set forth in claim 1 wherein the cylinder wall adjacent to said rotary valve is provided with heating means supplied from a source of heat independent of said engine.

References Cited in the file of this patent

UNITED STATES PATENTS

| | | |
|---|---|---|
| 542,846 | Diesel | July 16, 1895 |

FOREIGN PATENTS

| | | |
|---|---|---|
| 548,046 | France | Oct. 10, 1922 |
| 601,098 | France | Feb. 22, 1926 |
| 519,026 | Great Britain | Mar. 14, 1940 |